United States Patent
Benbouhout et al.

(10) Patent No.: US 10,780,750 B2
(45) Date of Patent: *Sep. 22, 2020

(54) METHOD FOR DETERMINING A WHEEL TIRE GROUND PRINT

(71) Applicants: CONTINENTAL AUTOMOTIVE FRANCE, Toulouse (FR); CONTINENTAL AUTOMOTIVE GMBH, Hannover (DE)

(72) Inventors: Rachid Benbouhout, Cugnaux (FR); Jean-Christophe Bouthinon, Cugnaux (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,992

(22) Filed: Jan. 16, 2019

(65) Prior Publication Data

US 2019/0143767 A1 May 16, 2019

Related U.S. Application Data

(63) Continuation of application No. 15/101,086, filed as application No. PCT/EP2014/003132 on Nov. 24, 2014, now Pat. No. 10,207,551.

(51) Int. Cl.
*B60C 23/04* (2006.01)
*B60C 23/06* (2006.01)
(Continued)

(52) U.S. Cl.
CPC ...... *B60C 23/0488* (2013.01); *B60C 23/0408* (2013.01); *B60C 23/0447* (2013.01);
(Continued)

(58) Field of Classification Search
CPC .................................................. B60C 23/0488
See application file for complete search history.

(56) References Cited

U.S. PATENT DOCUMENTS

| 5,749,984 A * | 5/1998 | Frey | B60C 23/064 |
| | | | 152/152.1 |
| 6,112,587 A | 9/2000 | Oldenettel | |

(Continued)

FOREIGN PATENT DOCUMENTS

| CN | 101124469 | 2/2008 |
| DE | 10 2006 020471 A | 11/2007 |

(Continued)

OTHER PUBLICATIONS

International Search Report, dated Mar. 5, 2015, from corresponding PCT application.

*Primary Examiner* — Raymond L Nimox
(74) *Attorney, Agent, or Firm* — Nixon & Vanderhye

(57) ABSTRACT

Method of determining the footprint of a tire on the ground, using devices already installed in standard production tires. Since the frequency of the transmitter clock present in a wheel unit is perturbed by mechanical vibrations when the tire contacts the ground, the frequency variations of the reference clock are representative of the value of the footprint. The method therefore includes determining the footprint on the ground of a tire of a wheel by measuring continuously, as a function of time, a signal representative of the variations in frequency of the reference clock supplied at the output of the time control device; determining a time interval during which the frequency variations of the reference clock occur; and, on the basis of the rotation speed of the tire, deducing therefrom an angular range of contact (Θ) corresponding to the footprint between the ends representing the ground contact length of the tire.

15 Claims, 4 Drawing Sheets

(51) Int. Cl.
    *G01B 21/02*     (2006.01)
    *B60C 19/00*     (2006.01)

(52) U.S. Cl.
    CPC ........ *B60C 23/0474* (2013.01); *B60C 23/064* (2013.01); *G01B 21/02* (2013.01); *B60C 2019/004* (2013.01)

(56) References Cited

U.S. PATENT DOCUMENTS

| | | | | |
|---|---|---|---|---|
| 6,538,566 | B1* | 3/2003 | Morand | B60C 23/0413 340/442 |
| 6,594,668 | B1 | 7/2003 | Becherer et al. | |
| 7,050,521 | B1* | 5/2006 | Alavi | H04L 27/2657 375/362 |
| 7,673,505 | B2 | 3/2010 | Hammerschmidt | |
| 8,048,106 | B2 | 11/2011 | Widmann | |
| 8,248,106 | B1* | 8/2012 | Cohen | H03L 7/081 327/156 |
| 2003/0149907 | A1* | 8/2003 | Singh | H03L 7/00 713/500 |
| 2004/0066290 | A1* | 4/2004 | Hernando | B60C 23/0416 340/447 |
| 2005/0145025 | A1 | 7/2005 | Fischer et al. | |
| 2007/0107505 | A1 | 5/2007 | Schillinger et al. | |
| 2008/0302177 | A1 | 12/2008 | Sinnett et al. | |
| 2009/0056433 | A1 | 3/2009 | Kvisteroey et al. | |
| 2009/0128315 | A1 | 5/2009 | Griesser et al. | |
| 2009/0205414 | A1 | 8/2009 | Vassilieff et al. | |
| 2010/0010770 | A1 | 1/2010 | Helck | |
| 2011/0071737 | A1* | 3/2011 | Greer | B60C 23/0416 701/49 |
| 2011/0086606 | A1* | 4/2011 | Chen | H03L 7/099 455/323 |
| 2012/0059551 | A1* | 3/2012 | Juzswik | B60C 23/0416 701/49 |
| 2012/0313714 | A1* | 12/2012 | Kargar | H03L 7/087 331/34 |
| 2012/0313715 | A1* | 12/2012 | Kargar | G01R 23/02 331/34 |
| 2013/0166140 | A1* | 6/2013 | Steiner | B60C 23/0459 701/34.4 |

FOREIGN PATENT DOCUMENTS

| | | |
|---|---|---|
| DE | 10 2009 057 579 | 6/2011 |
| DE | 10 2011 000 556 | 8/2012 |
| EP | 1 031 442 A2 | 8/2000 |
| EP | 1 826 530 A1 | 8/2007 |
| EP | 2 090 862 A1 | 8/2009 |
| FR | 2 866 269 A1 | 8/2005 |
| FR | 2 944 231 A1 | 10/2010 |
| FR | 2 985 014 A1 | 6/2013 |
| WO | 2007/074048 A1 | 7/2007 |

\* cited by examiner

METHOD FOR DETERMINING A WHEEL TIRE GROUND PRINT

The invention relates to a method for determining the length of the portion of a tire in contact with the ground, hereinafter called the footprint. When this footprint is known, it can provide useful information, in particular the load supported by the tire, the wear of the tire, or the pressure decrease in the tire. A knowledge of this footprint may also advantageously supplement tire pressure monitoring systems (or TPMS, the initials of "tire pressure monitoring system" in English terminology), braking computer aids (ABS, etc.), anti-skid systems, or other control systems.

BACKGROUND OF THE INVENTION

Up to the present time, this method has been implemented by adding a sensor to the pre-existing tire monitoring system. An example of this type of implementation is disclosed in patent document EP 2 090 862, which describes a method comprising the use of a magnetic sensor to determine the length of the footprint. This magnetic sensor, placed on the rim, analyzes the magnetic field that it receives. When this magnetic sensor is in the angular portion of the wheel which is in contact with the ground, the magnetic field is modified, enabling the footprint to be calculated on the basis of the magnetic field variation, the dimensions of the wheel and its rotation.

An improvement to this solution is disclosed in patent document FR 2 944 231. This document proposes a solution which is less costly than the use of pressure sensors. It proposes the placing of the magnetometers in a fixed manner, for example on the coil of a shock absorber spring. Each magnetometer measures the magnetic field of a metal belt placed under the tread of the tire near the magnetometer. This magnetic field is modified when the tire is flattened on the ground while rolling. The curve representing the received magnetic field as a function of the angle of rotation of the wheel then exhibits variations directly related to the deformation of the tire in contact with the ground.

These two examples show that the detection of a tire footprint is carried out at present with supplementary devices which are not incorporated into tire management systems such as TPMS or information systems such as TIS ("Tire Information System" in the English terminology). In the interests of cost reduction and simplification of equipment, therefore, it is advantageous to have a method which requires no supplementary device to provide a knowledge of tire footprints.

SUMMARY OF THE INVENTION

To this end, the invention proposes to use devices already present in the vehicle for measuring the contact patches of the tires. For this purpose, the present invention uses the impacts acting on these devices in order to define the footprint.

More precisely, the present invention proposes a method for determining the footprint of a tire of a vehicle equipped with a monitoring system comprising one wheel unit on each tire, said wheel unit comprising a microcontroller, a speed sensor, a transmitter, a reference clock of the transmitter having a given frequency, and at least one time control device for the system. This method consists in measuring continuously, as a function of time, a signal representative of the variations in frequency of the reference clock supplied at the output of the time control device; determining a time interval during which said frequency variations of the reference clock occur; and, on the basis of the rotation speed of the tire, deducing therefrom an angular range of contact corresponding to the footprint representing the ground contact length of the tire.

Thus, the invention advantageously exploits the fact that the frequency of the transmitter clock is perturbed by mechanical vibrations when the tire is in contact with the ground, and that frequency variations of the reference clock are therefore representative of the value of the footprint.

This method has the advantage of requiring no supplementary device for measuring the footprint of a tire, because it uses the possibilities offered by existing devices.

Advantageously, the method of the invention comprises the following successive steps:
 recording, as a function of time, the frequency of the reference clock and the variations of this frequency on the basis of said representative signal;
 determining the time interval during which said representative signal varies;
 deducing therefrom the angular contact range of the tire, corresponding to the time interval of the variations of the reference clock frequency;
 defining a detection threshold below which said frequency variations are disregarded;
 if the frequency variations are greater than the frequency threshold, calculating the footprint on the basis of the contact angle, the time interval and the wheel speed;
 defining boundaries for the value of the footprint beyond which the calculated value of the footprint is not accepted;
 defining a frequency of calculation for determining the footprint of the tire, and
 restarting the calculation at the frequency thus defined.

In one embodiment of the method according to the invention, the control device is a clock of the microcontroller, and the signal representative of the frequency variations of the reference clock is the relative variation of this frequency timed by the frequency of the microcontroller clock. This is because the microcontroller clock remains stable, whereas the frequency of the transmitter clock is perturbed by mechanical vibrations when the tire is in contact with the ground.

Since the microcontroller clock is of low precision, it is advantageous to calibrate it by using the reference clock of the transmitter in an angular range located outside the contact angle corresponding to the footprint.

In another embodiment, the control device is a phase lock detector of a phase lock loop with which the transmitter is equipped, and the signal representative of the frequency variations of the reference clock is a phase locking state information signal supplied by the phase lock detector to the microcontroller.

In operation, the detector signal carries information on the locking (phase locked or not) which is communicated to the microcontroller. This locking information is communicated in the form of logical values, varying between values referred to as "0", indicating phase locking, and "1", indicating an absence of phase locking. When the wheel unit is in contact with the ground, the operation of the transmitter clock is perturbed, and its frequency varies, thereby unlocking the phase of the phase lock loop. The signal of said phase lock detector then switches from the "0" value to the "1" value. Thus, the set of the "1" values of this signal can be used to find the value of the footprint.

Advantageously, the locking state information signal is supplied at the output of the phase lock detector in the form of pseudo-digital values, and a decision threshold is defined so that the values of said information signal at the output of said detector are considered to be a "1" value above this threshold and a "0" value below the threshold. A period of time during which the signal supplied by this detector remains equal to "1" then corresponds to the time interval over which the wheel unit is in the footprint.

In another embodiment, the locking state information signal is supplied directly at the output of the phase lock loop in the form of digital values varying between "0" and "1". A period of time during which the signal supplied by said loop remains equal to "1" then corresponds to the time interval over which the wheel unit is in the footprint.

BRIEF DESCRIPTION OF THE DRAWINGS

Other data, characteristics and advantages of the present invention will become apparent in the light of the following non-limiting description, referring to the attached drawings, which show, respectively.

DETAILED DESCRIPTION OF THE PREFERRED EMBODIMENTS

Figure 1:
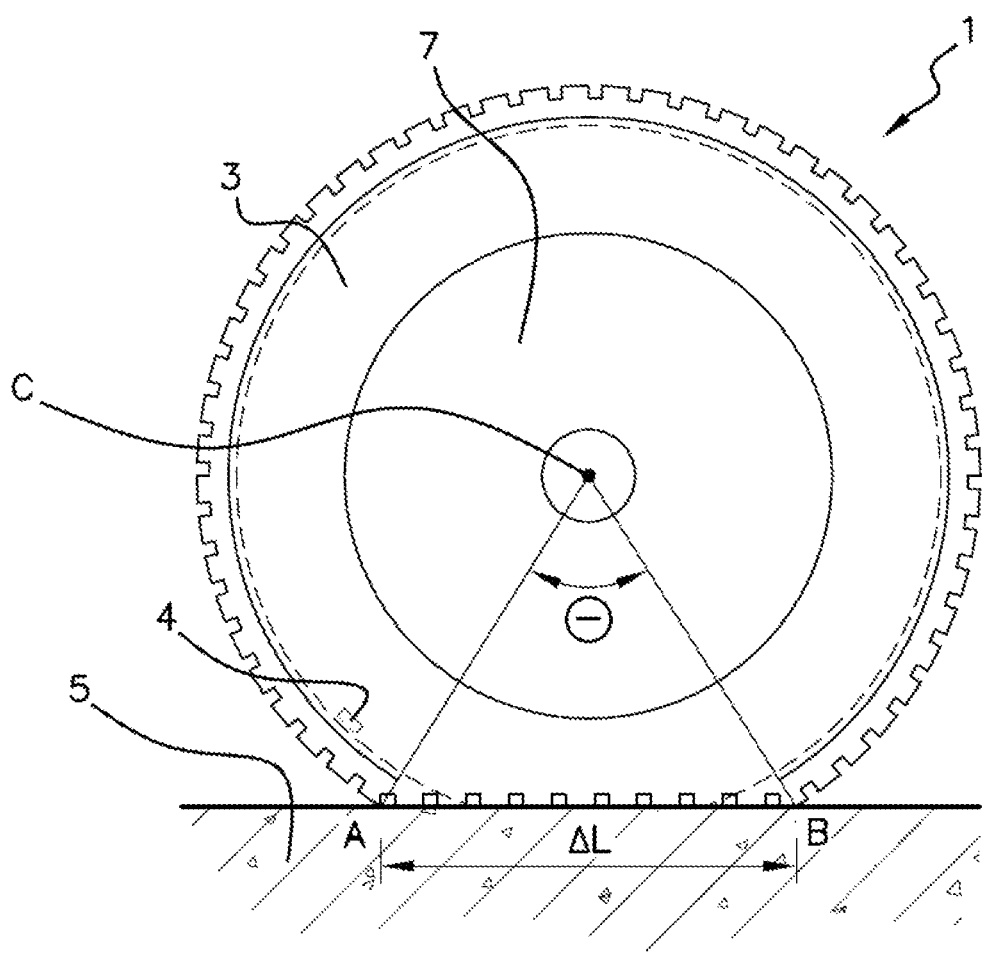
in FIG. 1, a schematic front view of a wheel fitted with a tire, showing the deformation of the tire on the ground and the resulting footprint of this tire.

FIG. 1 shows schematically, in a front view, a wheel 1 of a motor vehicle (not shown), fitted with a tire 3 around a rim 7, and with a wheel unit 4 which, in this example, is placed on the tread, inside the tire 3. This tire 3 is partially deflated, and its flattening on the ground 5 is represented by an area of length ΔL located between the two contact ends A and B, called the footprint ΔL. This footprint ΔL is also defined by the contact angle Θ formed by the two points A and B and the vertex of the angle in the center C of the wheel 1. When the wheel revolves, the wheel unit 4 is located between the ends A and B of the footprint once in every wheel revolution. The wheel unit 4 comprises, notably (FIG. 2), a transmitter 10 having a clock 16 timed to a frequency F. The frequency of the clock 16 of the transmitter 10 of the wheel unit 4 is perturbed when this wheel unit 4 is located in the footprint ΔL.

The length of the footprint ΔL is then determined on the basis of:

the frequency variations of the clock 16 of the transmitter 10 of the wheel unit 4 which is periodically located in this footprint area ΔL, the rotation speed of the wheel 1, and the radius of this wheel 1. Examples of wheel units implementing the measurement of the frequency variations of the clock 16 of the transmitter 10 are detailed below with reference to FIGS. 2 and 4.

Figure 2:
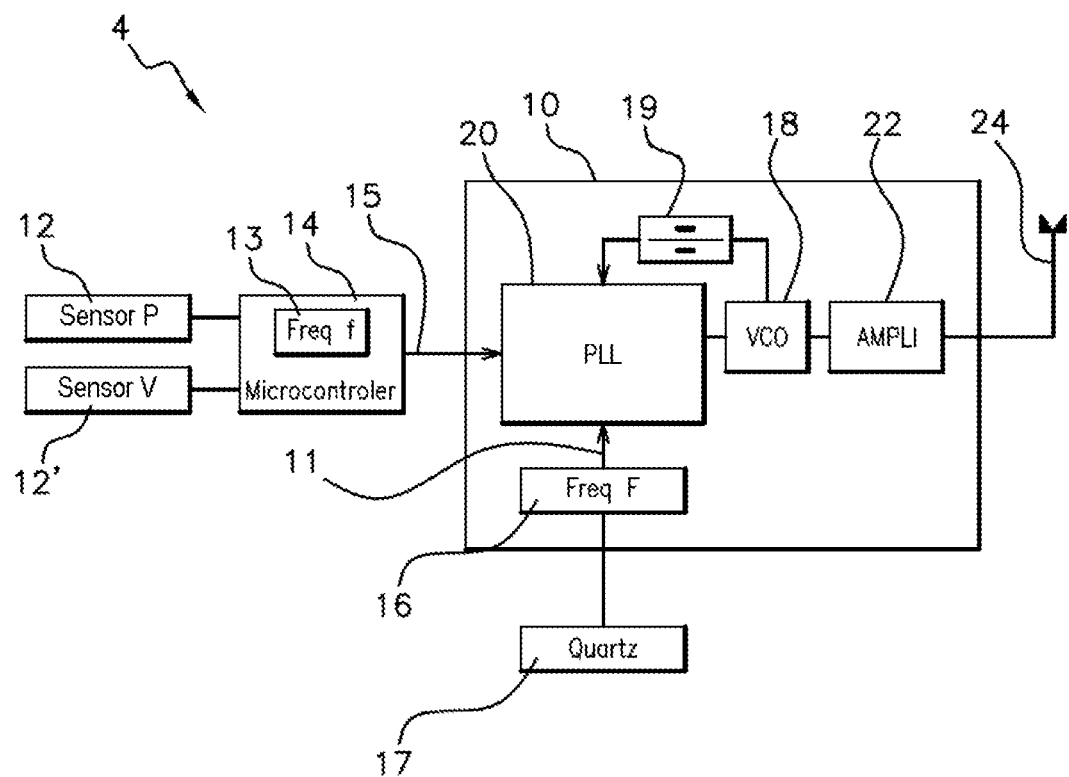
in FIG. 2, a block diagram of an exemplary wheel unit capable of implementing the method according to the invention when the frequency of the microcontroller of the wheel unit is used as the clock reference frequency.

The view of FIG. 2 shows a block diagram of an example of a wheel unit 4 equipped with a time control device formed by an internal clock 13, having a frequency "f", of a microcontroller 14. This wheel unit 4 comprises, in addition to the microcontroller 14 and its internal clock 13, a pressure sensor 12 and a speed sensor 12' connected to the transmitter 10 via a link 15 between the microcontroller 14 and the transmitter 10. This transmitter 10 transmits in the radio frequency domain by means of its antenna 24, and comprises a phase lock loop (abbreviated to PLL) 20, a frequency divider 19, a voltage-controlled oscillator 18, (abbreviated to VCO), a power amplifier 22 and a reference clock 16.

Provided with these devices, the wheel unit 4 operates as follows: the microcontroller 14 receives and processes the measurements made by the sensors 12 and 12', then transmits these measurements in the form of digitized data to a central unit placed in the vehicle (not shown), via the link 15 and the antenna 24 of said transmitter 10.

The data are initially digitized by the microcontroller 14 on the basis of the frequency "f" of its internal clock 13. The frequency of the data transmission is then timed by the frequency "F" of the reference clock 16, whose oscillations are locked to a quartz crystal 17.

This reference clock 16 is therefore precise, but its frequency "F" is perturbed when the wheel unit 4 is located, once in every wheel revolution, between the ends A and B of the footprint ΔL of the tire's ground contact (see FIG. 1). In the illustrated example, the frequency "F" of the reference clock 16 is about 20 MHz (more generally, between 10 and 30 MHz), and it undergoes variations that may reach 50 kHz when the wheel unit 4 is located within the footprint ΔL.

The internal clock 13 of the microprocessor 14 (having a frequency "f" of about 30 MHz) is relatively less precise than the reference clock 16, but has a frequency which is not perturbed when the wheel unit 4 is in the footprint ΔL, unlike that of the reference clock 16. The internal clock 13 is then advantageously used as a "benchmark" for the measurement of the perturbations of the frequency "F" of the reference clock 16.

The detection of these perturbations by the variations of the frequency "F" of the reference clock 16 therefore indicates that the wheel unit 4 is in the footprint ΔL of the tire on the ground, and the measurement of the duration of this detection can then be used to calculate the length of the footprint ΔL.

Figure 3:
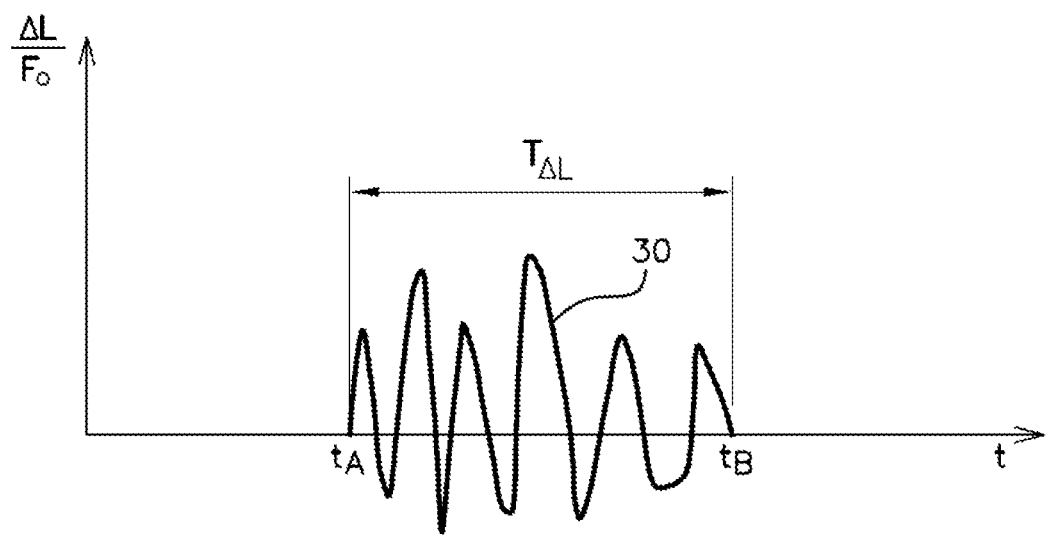
in FIG. 3, an example of a diagram of the measurement of the relative variation of the reference clock frequency of the wheel unit for determining the footprint of the tire on the ground, after calibration with the frequency of the internal clock of the microcontroller.

FIG. 3 shows this detection of the perturbations of the frequency "F" of the reference clock 16, in a diagram of the measurement of the relative variations $\Delta F/F_0$, as a function of time "t", of the frequency "F" with respect to $F_0$, $F_0$ being the non-perturbed frequency of the reference clock 16.

The measurement of the frequency "F" of the clock 16 of the transmitter 10 is timed by the frequency "f" of the internal clock 13 of the microprocessor 14 via the frequency divider 19. Advantageously, in order to increase the precision of the measurement, the internal clock 13 of the microcontroller 14 is calibrated in advance by the reference clock 16, which is more precise, during the phases in which the reference clock 16 is not perturbed by the contact of the tire with the ground (in other words, outside the footprint ΔL in FIG. 1).

The measurement of the relative variations $\Delta F/F_0$ takes the form of a curve 30. In a time interval $T_{\Delta L}$, the measurement $\Delta F/F_0$ undergoes significant changes in value—defined by $\Delta F$ above a threshold value $F_{Min}$ (see FIG. 6)—on either side of the zero value, between the two instants $t_A$ and $t_B$. These instants $t_A$ and $t_B$ define the boundaries of the time interval $T_{\Delta L}$ which therefore correspond to the period during which the frequency "F" of the reference clock 16 is perturbed and during which the wheel unit 4 is located in the ground contact area. The length of the footprint $\Delta L$ corresponding to this area is then deduced, given the contact angle $\Theta$—calculated on the basis of the time interval $T_{\Delta L}$ and the wheel speed—and the radius of the wheel. Outside the time interval $T_{\Delta L}$, the relative variation $\Delta F/F_0$ is zero, because the frequency "F" of the reference clock 16 is no longer perturbed when the wheel unit 4 is located outside the footprint.

Figure 4:
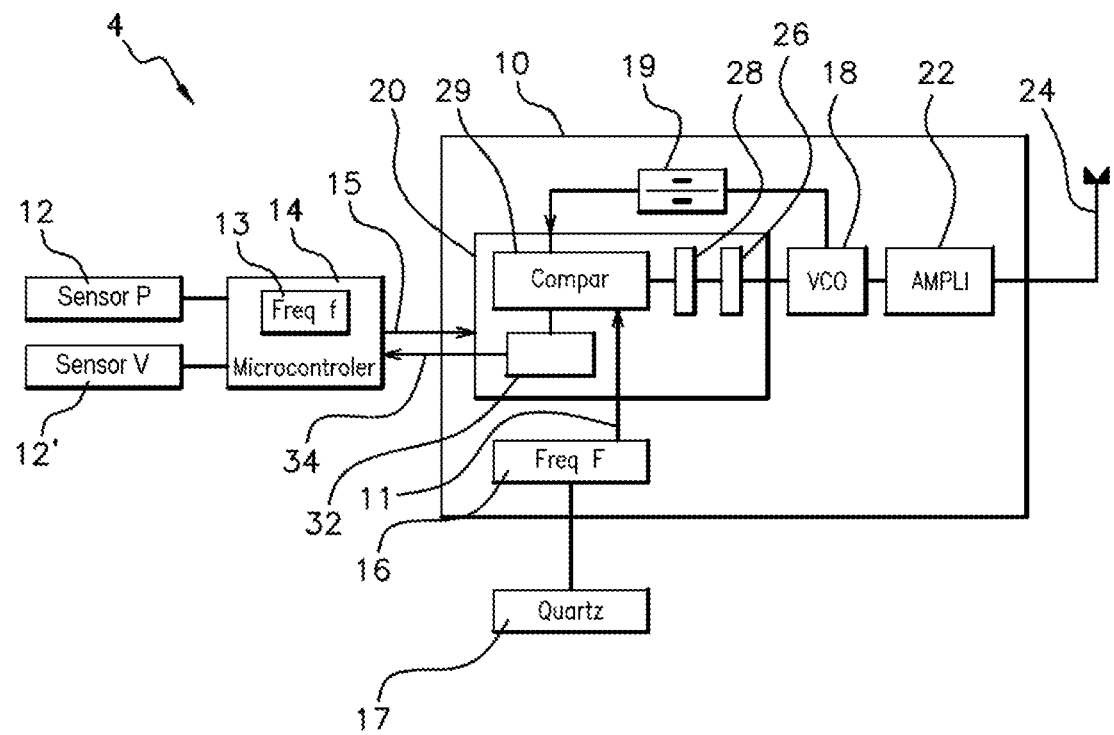
in FIG. 4, a block diagram of the wheel unit capable of implementing the method according to the invention when a phase lock detection function is used for measuring the perturbation of the reference clock.

FIG. 4 shows a block diagram using another time control device, in this case a phase lock detector 32, for measuring the perturbation of the reference clock 16 of the transmitter 10. This detector 32 belongs to a phase lock loop 20 which comprises the following components linked in sequence, in addition to this detector 32: a phase comparator 29, a feed pump 28 and a low-pass filter 26. The other referenced elements are described in the passage of the present description relating to the description of FIG. 2.

The phase lock detector 32 communicates synchronization measurements between the input and output voltages of said loop 20 to the microcontroller 14 via a wire link 34. These voltage measurements are communicated in the form of logical values, a "0" indicating phase synchronization and a "1" indicating phase opposition.

When the wheel unit 4 is in contact with the ground 5 (see FIG. 1), the operation of the clock 16 of the transmitter 10 is perturbed, and its frequency "F" varies, thereby unlocking the phase of the phase lock loop 20 (in other words, the input and output voltages of the loop are in phase opposition). The phase lock detector 32 then switches its signal from the "0" value to the "1" value. The period of time during which the signal supplied by this phase lock detector 32 remains equal to "1" corresponds to the time interval during which the wheel unit 4 is in the footprint $\Delta L$. The value of this footprint $\Delta L$ can then be accessed by a simple calculation, as explained below with reference to FIGS. 5a and 5b.

Figure 5A:
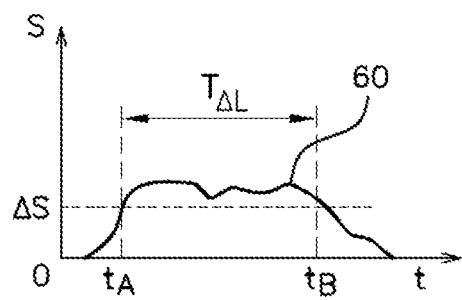
in FIGS. 5a and 5b, examples of diagrams of the measurement of the phase lock detection function for determining the footprint of the tire, and in FIG. 6, a flow diagram of an example of the sequence of steps in accordance with the method according to the invention.
Figure 5B:
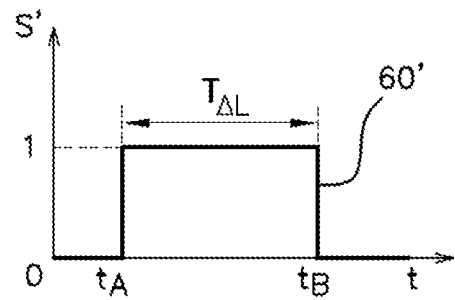

FIGS. 5a and 5b show examples of measurement diagrams, as a function of time "t", of the signals "S" and "S'" respectively, sent by the phase lock detector 32 and used to calculate the footprint $\Delta L$. In FIG. 5a, the signal "S" of said detector 32 is shown as a function of time "t" by the curve 60 as a direct output from this detector. The logical values output from the detector 32 are of the "pseudo-digital" type.

A critical threshold $\Delta S$ is then defined by a horizontal line of constant value, above which the values of the signal "S" are given the value "1" and below which the values of the signal "S" are given the value "0". The two instants $t_A$ and $t_B$ at which the curve 60 cuts the straight line $\Delta S$ correspond, respectively, to the start and end of the time interval $T_{\Delta L}$ for which the wheel unit 4 is in the footprint area $\Delta L$. Given the value of the time interval $T_{\Delta L}$, the footprint $\Delta L$ can then be calculated as explained above with reference to FIG. 3.

If the variations of the signal S do not allow a critical threshold $\Delta S$ to be defined in a sufficiently usable way, an alternative solution shown in FIG. 5b uses a signal "S'" supplied directly at the output of the phase lock loop 20. For this purpose, a phase detection function defines two phase states "0" and "1", which are, respectively, "in phase" and "in phase opposition".

These phase states are reproduced on the curve 60' of FIG. 5b where they indicate the measurement of the time interval $T_{\Delta L}$ for which the phase state is "1". This time interval $T_{\Delta L}$ corresponds, as described above, to the period for which the wheel unit 4 is in the footprint area $\Delta L$.

Figure 6:
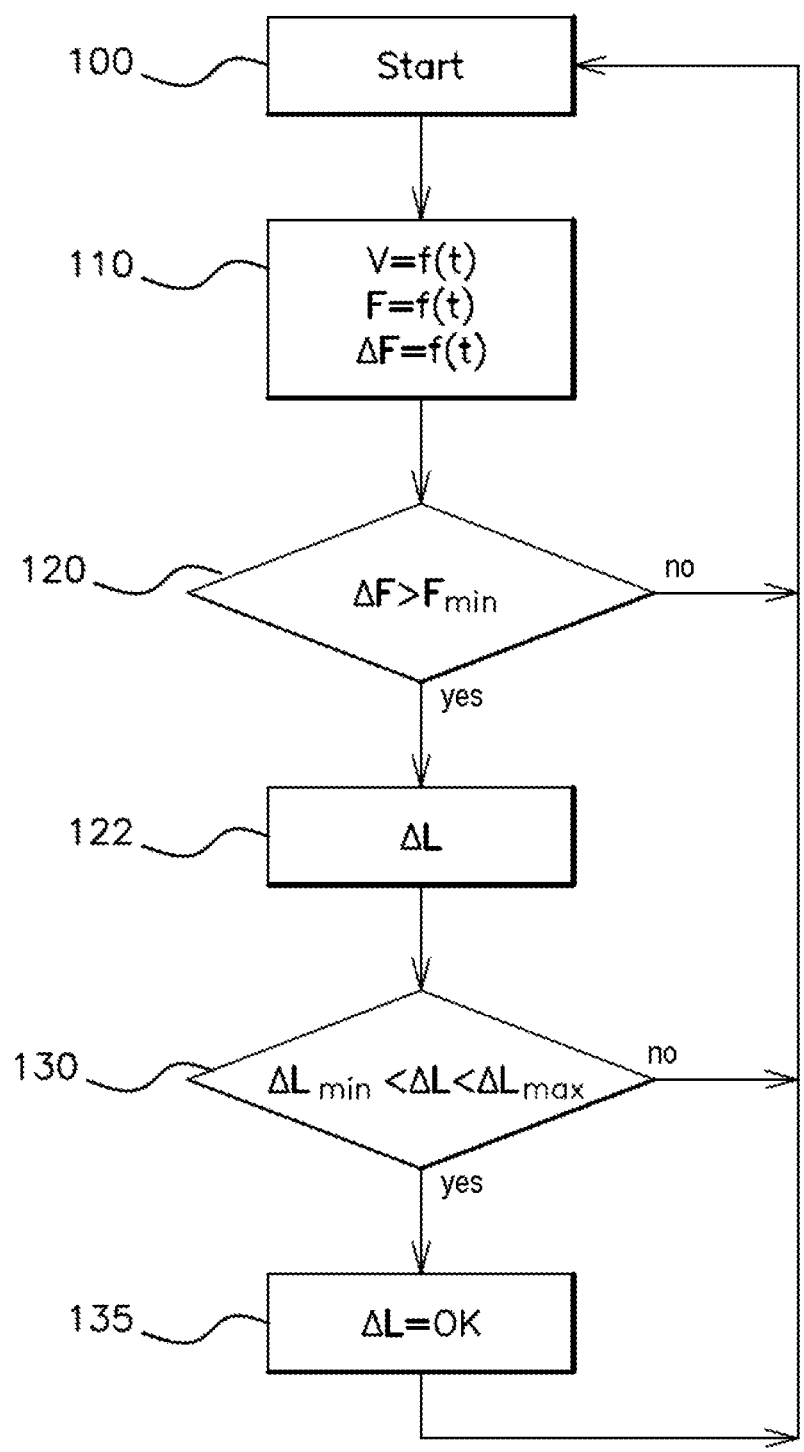

To provide a more precise illustration of the successive steps of the method for determining the footprint $\Delta L$, FIG. 6 shows a flow diagram of the progress of these steps 100 to 135. A first step 100, called "Start", serves to start the method and reinitialize it at a predetermined rate.

The recordings made in step 110 are those—as a function of time—of the rotation speed "V" of the wheel and the frequency "F" of the reference clock 16 (see FIGS. 2 and 4). The variations $\Delta F$ of the frequency "F" of the reference clock as a function of time "t" are determined on the basis of the variations of the signal transmitted by a time control device of the wheel unit, for example the clock of the microcontroller or the phase lock detector of the transmitter as described above.

In the test of step 120, the variations of frequency $\Delta F$ are compared with a minimum threshold $F_{Min}$ below which the variations $\Delta F$ are considered to be noise and are therefore disregarded. This threshold $F_{Min}$ is advantageously defined in the range from 1 to 10 kHz. If the variations $\Delta F$ are below the threshold $F_{Min}$, the process returns to the "Start" point of step 100. Otherwise, the process continues by calculating (step 122) the footprint $\Delta L$ on the basis of the time interval $T_{\Delta L}$ as defined above.

The test of step 130 then checks whether the value of the footprint $\Delta L$ is within a range of values defined between the boundaries $\Delta L_{min}$ and $\Delta L_{max}$, corresponding for example to contact angles $\Theta$ between 10° and 30°. If this condition is not met, the method returns to the "start" point of step 100. If the value of the footprint $\Delta L$ is within the range of values $\Delta L_{min}$-$\Delta L_{max}$, step 135 validates the calculated value of the footprint $\Delta L$. After validation, the method is reinitialized.

The invention is not limited to the exemplary embodiments described and represented.

Thus, if the microcontroller has a frequency divider, if the transmitter/microcontroller has a frequency demodulator coupled to a frequency mixer/reducer, or alternatively if the microcontroller has a digital signal processor (DSP) linked to a CAN (Control Area Network) network bus, then the frequency divider, the frequency mixer/reducer or the CAN may be used as control devices according to the invention.

Additionally, the signal of the reference clock of the transmitter, which is usually a quartz oscillator, may be frequency modulated to improve the precision of the measurements, and, in particular, the variations of frequency and the value of the footprint according to the method of the invention.

Furthermore, the detection of the phase of the phase lock loop may be implemented by any known means, for example by using the application known as "Lock Detector" in English.

The invention is also applicable to any method based on elements including a phase lock loop whose temporary perturbations are to be determined.

The invention claimed is:

1. A method for determining a footprint ($\Delta L$) of a tire (3), corresponding to a length of contact of said tire (3) with the ground, of a vehicle equipped with a monitoring system that includes one wheel unit (4) for each tire (3), each wheel unit (4) comprising a microcontroller (14), a speed sensor (12'), a transmitter (10), a reference clock (16) of the transmitter (10) configured to operate at a given frequency ($F_0$), and at least one time control device for the system, where an actual frequency (F) output by said reference clock (16) is subject to variations (ΔF) with respect to the given frequency ($F_0$) when the wheel unit is within the footprint of the tire, the method comprising:

continuously measuring, by way of said time control device, for the variations (ΔF) of the output frequency (F) of the reference clock (16) with respect to the given frequency ($F_0$), as a function of time;

determining a time interval ($T_{AL}$) during which said variations (ΔF) of the output frequency (F) occur, said time interval ($T_{AL}$) determined as a length of time between a first time at which said variations (ΔF) of the output frequency (F) begin to occur and a second time at which said variations (ΔF) of the frequency stop occurring; and calculating an angular contact range (Θ), corresponding to the footprint (ΔL) of the tire (3), from the determined time interval ($T_{AL}$) and a measured speed of rotation of the tire (3).

2. The footprint determination method as claimed in claim 1, wherein the time control device comprises a clock (13) of the microcontroller (14) with a frequency (f), and a measurement of the output frequency (F) of the reference clock (16) is timed by the frequency (f) of the clock (13) of the microcontroller (14) via a frequency divider (19).

3. The footprint determination method as claimed in claim 1, wherein the time control device is a phase lock detector (32) of a phase lock loop (20) with which the transmitter (10) is equipped, which generates a signal representative of the variations (ΔF) of the frequency (F) of the reference clock (16) as a phase locking state information signal (S, S') supplied by the phase lock detector (32) to the microcontroller (14).

4. The footprint determination method as claimed in claim 3, wherein the locking state information signal (S) is supplied at the output of the phase lock detector (32) in the form of pseudo-digital values (60), and wherein a decision threshold (ΔS) is defined such that the values of said information signal (S) at the output of said detector (32) are considered to have a value of "one" above the threshold (ΔS) and a value of "zero" below the threshold (ΔS), a period of time for which the signal (S) supplied by this detector (32) remains equal to "one" then corresponding to the time interval ($T_{AL}$) for which the wheel unit (4) is in the footprint (ΔL).

5. The footprint determination method as claimed in claim 3, wherein the locking state information signal (S') is supplied directly at the output of the phase lock loop (20) in the form of digital values (60'), varying between "zero" and "one", a period of time for which the signal (S') supplied by said loop (20) remains equal to "one" then corresponding to the time interval ($T_{AL}$) for which the wheel unit (4) is in the footprint (ΔL).

6. A method for determining a footprint (ΔL) of a tire (3) of a wheel (1), corresponding to a length of contact of said tire (3) with the ground, of a vehicle equipped with a monitoring system that includes one wheel unit (4) for each tire (3), each wheel unit (4) comprising a microcontroller (14), a speed sensor (12'), a transmitter (10), a reference clock (16) of the transmitter (10) configured to operate at a given frequency ($F_0$), and at least one time control device for the system, where an actual frequency (F) output by said reference clock (16) is subject to variations (ΔF) with respect to the given frequency ($F_0$) when the wheel unit is within the footprint of the tire, the method comprising the following steps:

measuring continuously, and recording (30, 60, 60'), as a function of time, the actual frequency (F) that is output by the reference clock (16);

determining and recording a time interval ($T_{AL}$) during which said variations (ΔF) of the actual frequency (F) of the reference clock (16) occur as a span of time between a first time when said variations (ΔF) of the actual frequency (F) begin to occur and a second time when said variations (ΔF) of the actual frequency (F) cease, said variations occurring throughout a length of the time interval ($T_{AL}$);

recording a rotation speed of the wheel (1) as a function of time based on an output of the speed sensor;

using the recorded time interval ($T_{AL}$) and the recorded rotation speed of the wheel (1) to calculate and record an angular contact range (Θ) of the tire (3);

defining a detection threshold ($F_{Min}$) below which said frequency variations (ΔF) are disregarded;

in a condition where the frequency variations (ΔF) are greater than the frequency threshold ($F_{Min}$), calculating the footprint (ΔL) on the basis of the angular contact range (Θ), the recorded time interval ($T_{AL}$), and the recorded rotation speed of the wheel (1).

7. The footprint determination method as claimed in claim 6, wherein the time control device is a clock (13) of the microcontroller (14), which generates a signal representative of the variations (ΔF) of the output frequency (F) of the reference clock (16) as a relative variation (ΔF/$F_0$) of the frequency (F) timed by the frequency of the clock (13) of the microcontroller (14).

8. The footprint determination method as claimed in claim 6, wherein the time control device is a phase lock detector (32) of a phase lock loop (20) with which the transmitter (10) is equipped, which generates a signal representative of the variations (ΔF) of the frequency (F) of the reference clock (16) as a phase locking state information signal (S, S') supplied by the phase lock detector (32) to the microcontroller (14).

9. The footprint determination method as claimed in claim 8, wherein the locking state information signal (S) is supplied at the output of the phase lock detector (32) in the form of pseudo-digital values (60), and wherein a decision threshold (ΔS) is defined such that the values of said information signal (S) at the output of said detector (32) are considered to have a value of "one" above the threshold (ΔS) and a value of "zero" below the threshold (ΔS), a period of time for which the signal (S) supplied by the detector (32) remains equal to "one" then corresponding to the time interval ($T_{AL}$) for which the wheel unit (4) is in the footprint (ΔL).

10. The footprint determination method as claimed in claim 8, wherein the locking state information signal (S') is supplied directly at the output of the phase lock loop (20) in the form of digital values (60'), varying between "zero" and "one", a period of time for which the signal (S') supplied by said loop (20) remains equal to "one" then corresponding to the time interval ($T_{AL}$) for which the wheel unit (4) is in the footprint (ΔL).

11. The footprint determination method as claimed in claim 1, wherein said variations (ΔF) of the output frequency of the reference clock with respect to the given frequency ($F_0$) are determined to occur when a variance of the output frequency (F) from the given frequency ($F_0$) is measured as having a magnitude that exceeds a predetermined threshold ($F_{Min}$).

12. The footprint determination method as claimed in claim 1, wherein the time control device comprises a clock

(13) of the microcontroller (14) with a frequency (f) that is not subject to variations when the wheel unit is within the footprint of the tire.

13. The footprint determination method as claimed in claim 6, further comprising:
defining boundaries ($\Delta L_{min}$, $\Delta L_{max}$) of the value of the footprint ($\Delta L$), beyond which the calculated value of the footprint ($\Delta L$) is not accepted.

14. The footprint determination method as claimed in claim 6, wherein the time control device comprises a clock (13) of the microcontroller (14) with a frequency (f), and a measurement of the output frequency (F) of the reference clock (16) is timed by the frequency (f) of the clock (13) of the microcontroller (14) via a frequency divider (19).

15. The footprint determination method as claimed in claim 14, wherein the frequency (f) of the clock (13) of the microcontroller (14) is not subject to variations when the wheel unit is within the footprint of the tire.

* * * * *